United States Patent [19]

Reven

[11] Patent Number: 4,487,804

[45] Date of Patent: Dec. 11, 1984

[54] COATING TO PREVENT THE OXIDATION OF ELECTRODES DURING ELECTRIC FURNACE STEEL MAKING

[75] Inventor: Frederick V. Reven, Homewood, Ill.

[73] Assignee: Nalco Chemical Company, Oak Brook, Ill.

[21] Appl. No.: 404,099

[22] Filed: Aug. 2, 1982

[51] Int. Cl.$^3$ .................. H01J 1/14; B32B 17/06
[52] U.S. Cl. .................. 428/408; 313/355; 427/59; 427/113; 427/397.7; 428/331; 428/334; 428/426; 428/446; 428/698; 428/702
[58] Field of Search ............... 428/408, 698, 446, 702, 428/331, 334, 426; 313/355, 633; 427/113, 59, 397.7

[56] References Cited

U.S. PATENT DOCUMENTS

| | | | |
|---|---|---|---|
| 504,105 | 8/1893 | Corleis | 428/408 |
| 2,897,102 | 7/1959 | Fisher | 428/408 |
| 3,264,135 | 8/1966 | Wakelyn | 428/408 |
| 3,553,010 | 1/1971 | Rubisch | 428/408 |
| 3,708,317 | 1/1973 | Owen | 428/408 |
| 3,713,882 | 1/1973 | DeBrunner | 428/408 |
| 3,852,107 | 12/1974 | Lorkin | 428/408 |
| 3,964,924 | 6/1976 | Kurzeja | 428/408 |

FOREIGN PATENT DOCUMENTS 1431891  4/1976  United Kingdom ............... 428/408

OTHER PUBLICATIONS

"Nucleation and Crystallization in Glasses", *Advances in Ceramics*, vol. 4, pp. 313–326, Edited by J. H. Simmons, 1982.

*Primary Examiner*—Ellis P. Robinson
*Attorney, Agent, or Firm*—John G. Premo; Robert A. Miller; Donald G. Epple

[57] ABSTRACT

A coating is provided which substantially lengthens the life of carbon and graphite electrodes used in electrical arc processes for the manufacture of ferrous metals. The coating forms a silica-phosphorus glass upon the electrodes.

10 Claims, No Drawings

COATING TO PREVENT THE OXIDATION OF ELECTRODES DURING ELECTRIC FURNACE STEEL MAKING

INTRODUCTION

Carbon and graphite electrodes are used in the production of ferrous metals in electric arc furnaces. These electrodes are subjected to severe operating conditions including high temperature, the spillation of molten steel on other metals, and the passage of large amounts of electricity through the electrodes. Electrodes used for these purposes vary in size from diameters of as small as 2 inches to upwards of 2 feet. Electrodes of this type, accordingly, can be very costly.

A serious problem which has faced industries using electrodes of this type has been the deterioration of the electrode during use due to adverse conditions. Oxidation of the carbon and/or graphite electrodes takes place readily at the high temperatures and other conditions at which these electrodes are operated. While, in effect, only the bottom tip of the electrode need be subjected to the conditions discussed above, the remainder of the electrode has, due to oxidation, deteriorated, shortening the life of electrodes placed in service. It, accordingly, would be an advance to the art if a coating could be provided that would prevent the oxidation of carbon and/or graphite electrodes subjected to these severe conditions. This coating would have to be stable at temperatures as high as 4000° F., but easy to apply to hot electrodes, and, additionally, must not interfere with the production of the finished steel product should it fall off into the furnace.

It is, accordingly, an object of this invention to provide to the art an electrode coating which will prevent the oxidation of carbon and graphite electrodes.

A further object of this invention is to provide to the art a coating which will lengthen the life of a consumable electrode used in the manufacture of steel in electrical arc furnaces. Such coating comprises a crystallized silica-phosphorus glass which has been bonded to the electrode.

Further objects will appear hereinafter.

THE INVENTION

The basic coating composition of this invention comprises in percentages by weight
10-70% water;
0.5-15% finely divided silicon dioxide;
1-25% phosphoric acid;
2-50% titanium dioxide;
2-50% metal carbide.

Additionally, the refractory electrode coating of this invention may contain both dispersants and/or thickeners to ease application. In order to better understand this invention, each component of the composition listed above will be discussed individually.

THE FINELY DIVIDED SILICONE DIOXIDE

The finely divided silicon dioxide useful in this invention may encompass any finely divided material containing substantially pure $SiO_2$. These materials include fumed silica, silica flour, and fine grain silica sands, preferably having a particle size of less than 200 mesh. A preferred finely divided silica for use in this invention has been discovered to be in the form of a colloidal silica sol, especially those dermed acid sols. An especially preferred material is sold by the Nalco Chemical Company under the designation, NALCOAG®10-34A. This material has the following properties:
Percent colloidal silica, as $SiO_2$: 34
pH: 3.1
Average particle size, millimicrons: 16-22
Average surface area, $m^2$/gram: 135-190
Specific gravity at 68° F.: 1.230
Viscosity at 77° F.c.p.s.: 5[1]
$Na_2O$, percent: 0.1[1]

[1] Less than

The coating composition of this invention will generally contain from 0.5-15% by weight as $SiO_2$ and, preferably, from 1-10% by weight prior to application on the electrodes. Most preferably, the composition of this invention will contain from 1.5-7.5% by weight finely divided silica.

THE PHOSPHORIC ACID

The phosphoric acid employed in this invention is used as the second component in the silica-phosphorous glass. The combination of the finely divided silica and the phosphoric acid forms a glass base at temperatures believed to be from 1600°-2000° F. While it is preferred to use as high a concentration of phosphoric acid in aqueous solution as possible, concentrations as low as 5 and 10% can be used. Preferably, 75% and higher aqueous solutions of phosphoric acid are used. The phorphoric acid component of this invention is generally used at a level of 1-25% by weight (as $H_3PO_4$) and, preferably, at a level of from 2-18 weight percent. Most preferably, from 4.5-15 weight percent phosphoric acid is employed.

THE TITANIUM DIOXIDE

The titanium dioxide component of this invention is believed to act as a nucleating agent in the formation of crystals in the silica-phosphorus glass. Titanium dioxide addition to the silica and phosphorus components forms a divitrifyable glass which is more refractory than the glass not containing titanium dioxide. While fulfilling a needed function in this regard, the titanium oxide also reacts with the carbon or graphite on the elctrode to form titanium carbides bonding the composition of this invention to the electrode at high temperatures.

In the preferred embodiment of this invention, it is preferred to use titanium dioxide of a size less than 100 mesh and, preferably, less than 325 mesh. It is most preferable to use a pigment grade titanium dioxide having a particle size of approximately 5 microns. Larger particle sizes, however, may be employed.

In the formulation of the compositions of this invention, from 2-50 weight percent and, preferably, 3-35 weight percent of the titanium dioxide is employed. Most preferably, compositions of the subject invention contain from 10-30 weight percent titanium dioxide.

THE METAL CARBIDE

The metal carbide component and, preferably, silicon carbide, acts as an inert refractory grain which holds the glass in place at the high temperatures encountered. While the metal carbide is preferably silicon carbide materials such as tantalum carbide, tungsten carbide and molybdenum carbide can be employed.

The metal carbide component of this invention is generally present at a level of 2-50 weight percent and, preferably, from 3-35 weight percent. Most preferably, it is present at a level of from 10-30% by weight.

THE DISPERSANT

The optional dispersant which may be used in the formulation of coating compounds of the type described in this invention may be either organic or inorganic. Suitable organic dispersing agents include low molecular weight copolymers of acrylic acid, 2 hydroxyethyl acrylate, acrylamide, sodium vinyl sulphonate, etc. Inorganic dispersants which can be used include sodium hexametaphosphate which is, in fact, the preferred dispersant for use in this invention. Other inorganic dispersants may be utilized.

It will be seen that the use of a dispersant is not critical to this invention and only helps to keep the components dispersed before a final application to the electrode.

When employed, the dispersant is generally used at a level of from 0.05–7.5 weight percent and, preferably, from 0.1–7%. Most preferably, when a dispersant is employed, it is present at a level of from 0.25–5%.

THE THICKENER

The thickener which may be used in this invention is generally an organic material such as a xanthanum gum, high molecular weight cross-linked water-soluble polymer, or the like. The thickener is employed to aid the dispersant in holding all the ingredients of the composition in suspension and, also, as an aid in application. A preferred thickener for use in this invention is a xanthanum gum sold under the tradename, Kelzan. When thickeners are employed in compositions of this type, they are generally used at levels of from 0.01–5.0% and, preferably, from 0.05–2.0% by weight. Most preferably, they are used at levels of from 0.1–1% by weight.

THE WATER

Water is used to prepare the coatings of this invention so as to enable them to be sprayed or otherwise applied to the electrodes. While the amount of water employed is not critical, generally it is believed that from 10–70% by weight water will produce a material which is sprayable and easily handleable. Preferably, from 15–60% of the coating composition is water and, most preferably, from 20–50%.

THE FORMULATION OF THE COATINGS OF THE INVENTION

The coating compositions of the subject invention are easily prepared by simply mixing the above mentioned ingredients in the weight ratios specified above. Care should be taken so that a material is produced that is fluid and easily handleable and, ideally, one that is sprayable for application. As stated above, while the amount of water present in the composition is not critical, the material must be fluid or, at least, must be fluid prior to its application upon electrodes so that it may be sprayed or brushed to obtain a thin coating.

APPLICATION OF THE COMPOSITION TO THE ELECTRODES

The compositions described above are applied to carbon and/or graphite electrodes by spray means, brushing means, or other means for applying the material to the elecrodes. The material should be applied to the electrodes to obtain a coating of no greater than $\frac{1}{4}$ inch thickness when dry and, preferably, 1/300 inch thickness when dry. When applying it to the electrode, care must be taken not to coat the area of the electrode through which electrical contact is made. Since the coating of this invention, when dry, is di-electric, if applied in the area into which current is passed into the electrode, it will insulate the electrode with the possibility of malfunction of the power source and handling equipment.

We have found that a preferred method for applying the coating to electrodes is by a spray method. Using this type of system, compressed air is used to force a quantity of the coating composition through a spray gun and onto the electrode. Coatings produced in this manner have been uniform and have performed without problem.

The electrodes may be coated with the composition of this invention whether they are at furnace heat or at room temperature. Coatings applied to hot electrodes dry readily and the actual coating composition, a crystallized silica-phosphorous glass composition, is not believed to be formed until the electrode reaches a certain temperature. Accordingly, electrodes coated with the composition of this invention will, after attaining a service temperature, have a coating thereon of a crystallized silica-phosphorous glass composition. These types of impermeable coatings prevent oxidation of the electrodes and, substantially lengthen their service life.

EXAMPLE

A composition was prepared containing the following ingredients:

| Ingredient | % by Weight |
| --- | --- |
| Water | 38.8 |
| NALCOAG 1034-A | 10.0 |
| 75% $H_3PO_4$ | 10.0 |
| Sodium Hexametaphosphate | 1.0 |
| $TiO_2$ | 20.0 |
| SiC (#5) | 20.0 |
| Kelzan | 0.1 |

The subject composition, after formulation, was stable and was readily sprayable.

A graphite electrode to be used in an electric arc furnace owned by a major steel manufacturer was coated with a thin layer of the composition previously described. This coating would be approximately 1/30 inch thick when dry. The electrode was then installed in its holder and employed in the production of steel in the electric arc furnace. The electrode coated by the composition of this invention suffered substantially less oxidation deterioration than electrodes not so treated, and it was estimated that up to 20% savings in electrodes could be produced using the coated electrodes of this invention over electrodes not so treated.

Having thus described my invention, I claim:

1. An electrically conductive consumable carbon and/or graphite electrode having an impermeable coating of less than $\frac{1}{4}''$ thickness of a non-electrically conducting crystallized devitrifyable silica-phosphate glass containing titanium dioxide.

2. An electricaly conductive consumable electrode from the group consisting of carbon and graphite electrodes, having coated thereon an impermeable layer of less than $\frac{1}{4}''$ of a composition that, when dried, is a non-electrically conducting crystallized devitrifyable silica phosphate glass, said composition prior to being applied to the electrode comprising in percentages by weight:

10–70% water;
0.5–15% finely divided silicon dioxide having a particle size less than 200 mesh;
1–25% phosphoric acid;
2–50% titanium dioxide having a particle size of less than 375 mesh;
2–50% silicon carbide.

3. The electrode of claim 2 having been coated with a composition comprising in percentages by weight:
15–60% water;
1–10% finely divided silicon dioxide having a particle size less than 200 mesh;
2–18% phosphoric acid;
3–35% titanium dioxide having a particle size of less than 375 mesh;
3–35% silicon carbide.

4. The electrode of claim 2 having been coated with a composition comprising in percentages by weight:
20–50% water;
1.5–7.5% finely divided silicon dioxide having a particle size less than 200 mesh;
4.5–15% phosphoric acid;
10–30% titanium dioxide having a particle size of less than 375 mesh;
10–30% silicon carbide.

5. An electrically conductive electrode from the group consisting of carbon and graphite electrodes, having coated thereon an impermeable layer of less than ¼" of a composition that, when dried, is a non-electrically conducting crystallized devitrifyable silica phosphate glass, said composition prior to application to the electrode comprising in percentages by weight:
10–70% water;
0.5–15% finely divided silicon dioxide having a particle size less than 200 mesh;
1–25% phosphoric acid;
2–50% titanium dioxide having a particle size of less than 375 mesh;
2–50% silicon carbide;
0.05–7.5% sodium hexameta phosphate;
0.01–5.0% organic thickener.

6. The electrode of claim 5 having been coated with a composition comprising:
15–60% water;
1–10% finely divided silicon dioxide having a particle size less than 200 mesh;
2–18% phosphoric acid;
3–35% titanium dioxide having a particle size of less than 375 mesh;
3–35% silicon carbide;
0.1–7% sodium hexameta phosphate;
0.05–2.0% organic thickener.

7. The electrode of claim 5 having been coated with a composition comprising:
20–50% water;
1.5–7.5% finely divided silicon dioxide having a particle size less than 200 mesh;
4.5–15% phosphoric acid;
10–30% titanium dioxide having a particle size of less than 375 mesh;
10–30% silicon carbide;
0.25–5% sodium hexameta phosphate;
0.1–1.0% organic thickener.

8. A method of protecting carbon and graphite electrodes used in the production of ferrous metals in electrical arc furnaces from oxidation during use which comprises coating said electrodes prior to their use with a composition comprising in percentages by weight:
10–70% water;
0.5–15% finely divided silicon dioxide having a particle size less than 200 mesh;
1–25% phosphoric acid;
2–50% titanium dioxide having a particle size of less than 375 mesh;
2–50% silicon carbide;
0.05–7.5% sodium hexameta phosphate;
0.1–5.0% organic thickener;
whereby the composition forms a crystallized devitrifyable silica-phosphate glass protecting the electrode from oxidation during use.

9. The method of claim 8 wherein the composition comprises:
15–60% water;
1–10% finely divided silicon dioxide having a particle size less than 200 mesh;
2–18% phosphoric acid;
3–35% titanium dioxide having a particle size of less than 375 mesh;
3–35% silicon carbide;
0.1–7% sodium hexameta phosphate;
0.05–2.0% organic thickener.

10. The method of claim 8 wherein the composition comprises:
20–50% water;
1.5–7.5% finely divided silicon dioxide having a particle size less than 200 mesh;
4.5–15% phosphoric acid;
10–30% titanium dioxide having a particle size of less than 375 mesh;
10–30% silicon carbide;
0.25–5.0% sodium hexameta phosphate;
0.1–1.0% organic thickener.

* * * * *